United States Patent
Uchiyama et al.

(10) Patent No.: US 7,261,540 B2
(45) Date of Patent: Aug. 28, 2007

(54) CONTROLLER OF INJECTION MOLDING MACHINE

(75) Inventors: Tatsuhiro Uchiyama, Gotenba (JP); Minoru Kobayashi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 226 days.

(21) Appl. No.: 11/149,189

(22) Filed: Jun. 10, 2005

(65) Prior Publication Data

US 2005/0281905 A1 Dec. 22, 2005

(30) Foreign Application Priority Data

Jun. 17, 2004 (JP) .............................. 2004-179731

(51) Int. Cl.
*B29C 45/77* (2006.01)
(52) U.S. Cl. ....................... 425/145; 425/149
(58) Field of Classification Search ................ 425/145, 425/149
See application file for complete search history.

(56) References Cited

U.S. PATENT DOCUMENTS 4,060,362 A * 11/1977 Wilson, III ................. 425/145
5,246,645 A    9/1993 Tagawa et al.

FOREIGN PATENT DOCUMENTS

| JP | 5-293868   | 11/1993 |
| JP | 7-1522     | 1/1995  |
| JP | 7-9514     | 1/1995  |
| JP | 7-246642   | 9/1995  |
| JP | 9-277328   | 10/1997 |
| JP | 2002-137273| 5/2002  |

OTHER PUBLICATIONS

European Search Report, dated Sep. 30, 2005, for related European Application No. EP 05 25 3640.
Japanese Patent Office Action, mailed Apr. 3, 2007, and issued in priority Japanese Patent Application No. 2004-179731.

* cited by examiner

*Primary Examiner*—Tim Heitbrink
(74) *Attorney, Agent, or Firm*—Staas & Halsey LLP

(57) ABSTRACT

A controller of injection molding machine capable of stabilizing a peak pressure of resin appearing when an injection process is switched to a pressure-holding process, by reducing the variation of the peak pressure. Resin pressure Pr is detected at every predetermined sampling period Δt. There is a time lag between the time at which the resin pressure reaches an injection/pressure-holding switch determining resin pressure P(v–p) and the sampling time t2 at which the resin pressure that has reached the value P(v–P) is detected. Hence, a difference Ve between the detected resin pressure value Pr' and the switch determining resin pressure P(v–p) is obtained. The transition time period T in which pressure should be changed from a pressure-holding start pressure Ps to a pressure-holding pressure Pp is corrected by T=T0−α× Ve to make the transition time period T shorter when the difference Ve is greater, to thereby hold down the peak pressure Pmax. By this, the variation ΔPmax of the peak pressure Pmax is reduced. Since the pressure is kept uniform, the quality of a molded produce improves.

7 Claims, 3 Drawing Sheets

CONTROLLER OF INJECTION MOLDING MACHINE

BACKGROUND OF THE INVENTION

1. Field of the Invention

The present invention relates to a controller of an injection molding machine, particularly a controller to perform a stable switch from an injection process to a pressure-holding process.

2. Description of Related Art

In the molding by an injection molding machine, resin is injected to fill a cavity of a mold (injection process) and then the pressure exerted is kept at a predetermined pressure value for a predetermined time period (pressure-holding process). Generally, whether or not the cavity is filled with resin is determined by the position of an injection screw or by detecting an actual value for injection pressure, since when the cavity is filled with resin, the injection pressure increases. When the injection screw reaches a predetermined position or when the detected value for injection pressure is equal to or greater than a predetermined pressure value, control is performed to switch speed control on the injection screw in the injection process to pressure control for the pressure-holding process.

It is ideal if the pressure changes to a predetermined pressure-holding pressure (pressure at which the pressure should be kept in pressure holding) immediately when the injection process is switched to the pressure-holding process. Actually, however, the pressure does not immediately change to the predetermined pressure-holding pressure but reaches the predetermined pressure-holding pressure with a delay. Further, even when the pressure is changed to the pressure-holding pressure at the time a pressure value equal to a predetermined switch pressure (pressure with which the switch from the injection process to the pressure-holding process should be started) is detected, the pressure overshoots, namely increases beyond the predetermined switch pressure to take a peak value.

This peak pressure is exerted on the resin in the cavity of the mold and affects the quality of a molded article.

As a technique for keeping the peak pressure within a predetermined pressure range in the instance in which the switch from the injection process to the pressure-holding process is performed on the basis of the position of the injection screw, it is known to detect the resin pressure at the time the switch is performed and adjust the position which the injection screw takes when the switch is performed or when the measurement ends so that the pressure value detected is within the predetermined pressure range (see JP 7-9514A).

Further, an invention is known in which a time period Tpd taken for the pressure to change from a current detected value to a predetermined maximum injection pressure is obtained from a rate of increase of the injection pressure, which is obtained by differentiating the expression for the pressure detected by a pressure detector; a deceleration time period Tvd is obtained from the deceleration characteristic of an actuator and a predetermined injection speed; deceleration is started when the deceleration time period Tvd is equal to or greater than the time period Tpd taken for the pressure to reach the predetermined maximum injection pressure; a time period T1 taken for the pressure to increase from a predetermined pressure-holding pressure to the maximum injection pressure is measured; and the pressure is decreased from the maximum injection pressure to the pressure-holding pressure according to a pressure-decreasing pattern having a gradient which is an integer times the gradient of the measured time period T1 (see JP 7-1522A).

When the cavity of the mold is filled with resin in the injection process and the injection process is switched to the pressure-holding process, the pressure takes a peak value (maximum pressure) and the resin in the cavity experiences this peak pressure. Since the peak pressure affects the quality of a molded article, it is desirable to control the peak pressure accurately. In the above-mentioned inventions disclosed in JP 7-9514A and JP 7-1522A, a target for the peak pressure is predetermined and control is performed so that the peak pressure agrees with this target, however variation of the actual peak pressure is not taken into consideration.

In the control on the injection molding machine, the resin pressure is detected at every predetermined sampling period, and the switch from the injection process to the pressure-holding process is performed on the basis of the detected value for the resin pressure. The same is true of the inventions disclosed in JP 7-9514A and JP 7-1522A. The detected value for the resin pressure is subject to detection error due to the sampling period. Further, even when the speed control is immediately switched to the pressure control for pressure holding at the time a pressure value equal to the predetermined switch pressure is detected, the pressure overshoots and the peak pressure is not always the same.

FIGS. 2a and 2b are diagrams for explaining the variation of the peak pressure appearing when the injection process (speed control) is switched to the pressure-holding process (pressure control).

In FIGS. 2a and 2b, the horizontal axis represents time, and the vertical axis represents resin pressure. Vertical broken lines distributed along the axis representing time indicate sampling times at which the pressure is detected. The period between the sampling times is Δt. Pp is a pressure predetermined as a pressure value at which the pressure should be kept in pressure holding (referred to as "pressure-holding pressure"), P(v–p) is a resin pressure value predetermined as a criterion for determining whether to switch from injection to pressure holding (referred to as "injection/pressure-holding switch determining resin pressure"), and Ps is a pressure predetermined as a pressure value with which the switch should be started (referred to as "switch start pressure"). Pr is actual resin pressure, and Pr' is a resin pressure value detected by a pressure sensor as a value that has reached or exceeded the injection/pressure-holding switch determining resin pressure P(v–p). Pc is a command value for pressure for the pressure control in the pressure-holding process.

Suppose that injection is performed, so that the resin pressure Pr increases and exceeds the injection/pressure-holding switch determining resin pressure P(v–p) a little after sampling time t1 as shown in FIG. 2a. At the sampling time t1, it is not recognized that the resin pressure Pr has reached the injection/pressure-holding switch determining resin pressure P(v–p). The fact that the resin pressure Pr has reached the injection/pressure-holding switch determining resin pressure P(v–p) is recognized at sampling time t2, namely one sampling period Δt after the sampling time t1 (detected resin pressure value Pr'). At this time, the switch to the pressure-holding process is performed and the pressure control is started, however the resin pressure overshoots and a peak pressure Pmax appears after the switch.

FIG. 2b shows an instance in which the resin pressure exceeds the injection/pressure-holding switch determining resin pressure P(v–p) after sampling time t1, a little before sampling time t2. At the sampling time t2, the fact that the resin pressure has reached the injection/pressure-holding switch determining resin pressure P(v–p) is recognized (detected resin pressure value Pr'). At this time, the switch to the pressure-holding process is performed and the pressure control is started. Also in this instance, the resin pressure overshoots and a peak pressure Pmax appears after the switch.

Comparison between FIGS. 2a and 2b shows that, in the instance of FIG. 2a, although the actual resin pressure Pr has reached the injection/pressure-holding switch determining resin pressure P(v–p), it is about one sampling period Δt later than in the instance of FIG. 2b that the fact that the actual resin pressure has reached the injection/pressure-holding switch determining resin pressure P(v–p) is recognized and the pressure-holding control is started. Hence, in the instance of FIG. 2a, after the actual resin pressure has reached the injection/pressure-holding switch determining resin pressure P(v–p), the pressure-holding control is started about one sampling period Δt later than in the instance of FIG. 2b, so that the amount of overshooting is larger and the peak pressure is greater than in the instance of FIG. 2b, correspondingly. Thus, as shown in FIG. 2, there is a variation ΔPmax of the peak pressure.

As stated above, regarding the time at which the pressure that has reached the injection/pressure-holding switch determining resin pressure P(v–p) is detected, there is a difference corresponding to one sampling period Δt at the most, and the peak pressure vanes corresponding to this difference.

SUMMARY OF THE INVENTION

The present invention provides an injection molding machine capable of stabilizing the peak pressure by reducing the variation thereof.

According to an aspect of the invention, a controller of an injection molding machine controls resin pressure in switching an injection process to a pressure-holding process by changing a command value of the resin pressure from a preset first value to a preset second value for the pressure-holding process in a preset transition time period. The controller comprises: detecting means for detecting the resin pressure; determining means for performing comparison of the resin pressure detected by the detecting means with a preset switching pressure for switching the injection process to the pressure-holding process at every predetermined period, and determining completion of the injection process when the detected resin pressure exceeds the preset switching pressure; and correcting means for correcting the transition time period according to a difference between the preset switching pressure and the detected resin pressure when the completion of the injection process is determined by the determining means after the injection process is started. By correcting the transition time period, the variation of the peak pressure is reduced.

The correcting means may obtain a correction time period by multiplying the above difference by a preset correction coefficient, and correct the transition time period to be a value obtained by subtracting the correction time period from a reference transition time period.

According to another aspect of the invention, a controller of an injection molding machine controls resin pressure by switching a feedback control of an injection speed for an injection process to a feedback control of the resin pressure for a pressure-holding process. The controller comprises: detecting means for detecting the resin pressure in the injection process; determining means for performing comparison of the resin pressure detected by the detecting means with a predetermined switching pressure for switching the injection process to the pressure-holding process at every predetermined period, and determining completion of the injection process when the detected resin pressure exceeds the predetermined switching pressure; and correcting means for correcting a feedback gain of the feedback control of the resin pressure in a period immediately after the pressure-holding process is started according to a difference between the preset switching pressure and the detected resin pressure when the completion of the injection process is determined by the determining means after the injection process is started. By adjusting the gain of the feedback control of the resin pressure, the variation of the peak pressure is reduced.

In the above arrangement, the detecting means may detect the resin pressure as a pressure exerted on an injection screw, or as a pressure in a mold.

Since the variation of the peak pressure is reduced, molded articles of high quality can be obtained.

DETAILED DESCRIPTION

Figure 1A:
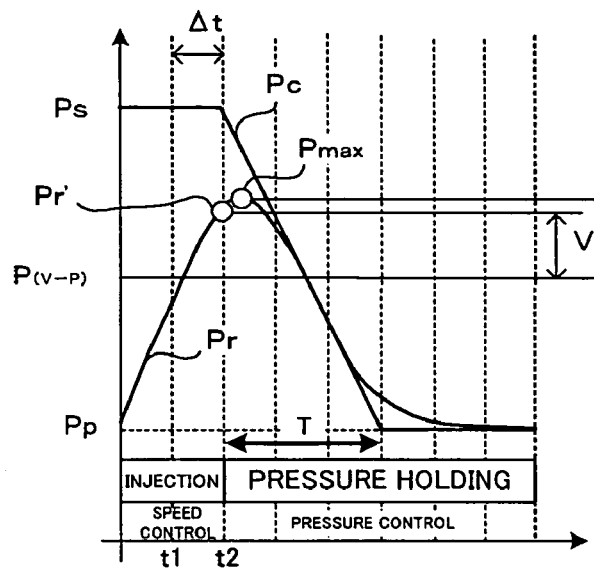
FIG. 1 is a diagram for explaining the principle of operation of the present invention.
Figure 1B:
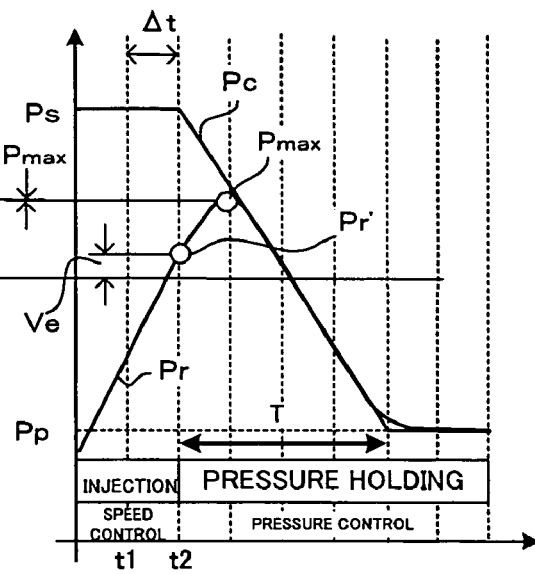
Figure 2A:
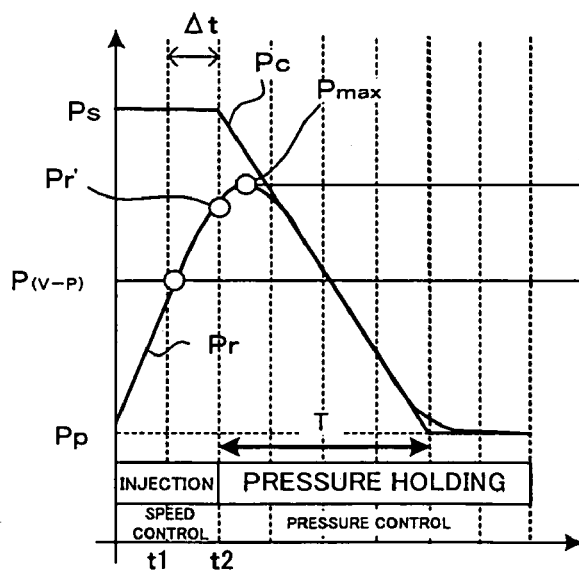
FIG. 2 is a diagram for explaining the variation of the peak pressure appearing when the injection process is switched to the pressure-holding process in a conventional instance.
Figure 2B:
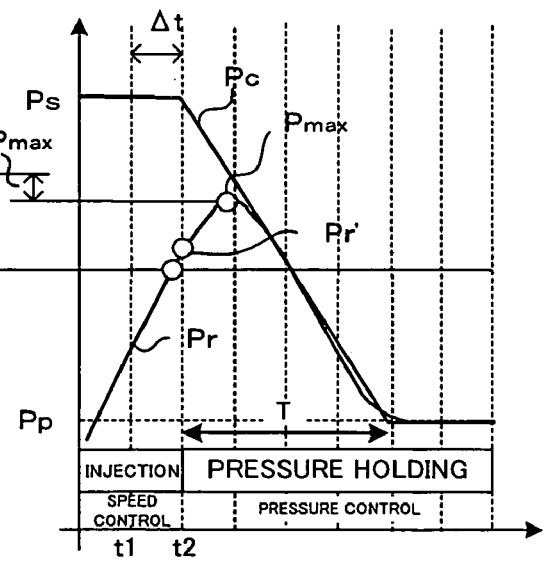

Referring to FIGS. 1a and 1b, the principle of operation of the present invention will be explained. In FIGS. 1a and 1b, the horizontal axis represents time and the vertical axis represents pressure, as in FIGS. 2a and 2b. The vertical broken lines distributed along the axis representing time indicate sampling times at which pressure is detected, and the period between the sampling times is Δt. Pp is a pressure preset as a pressure value at which pressure should be kept in pressure holding (referred to as "pressure-holding pressure"), P(v–p) is a resin pressure value preset as a criterion for determining whether to switch from injection to pressure holding (referred to as "injection/pressure-holding switch determining resin pressure"), and Ps is a pressure preset as a pressure value with which the switch should be started (referred to as "switch start pressure"). Pr is actual resin pressure, and Pr' is a resin pressure value detected by a pressure sensor as a value that has reached or exceeded the injection/pressure-holding switch determining resin pressure P(v–p). Pc is a command value for pressure for pressure control in the pressure-holding process.

FIG. 1a shows an instance in which the resin pressure exceeds the injection/pressure-holding switch determining resin pressure P(v–p) a little after sampling time t1, and the fact that the resin pressure has reached the injection/pressure-holding switch determining resin pressure. P(v–p) is recognized at sampling time t2. FIG. 1b shows an instance in which the resin pressure exceeds the injection/pressure-holding switch determining resin pressure P(v–p) a little before sampling time t2, and the fact that the resin pressure has reached the injection/pressure-holding switch determining resin pressure P(v–p) is recognized at sampling time t2. Between the instance of FIG. 1a and the instance of FIG. 1b, there is a difference in the length of time between the time at which the actual resin pressure Pr reached the injection/ pressure-holding switch determining resin pressure P(v–p) and the time at which this fact was recognized. The difference corresponds to one sampling period Δt at the most.

When it is recognized that the resin pressure has reached or exceeded the injection/pressure-holding switch determining resin pressure P(v–p), the switch to pressure control for the pressure-holding process is performed immediately. However, the peak pressure Pmax appearing in the overshooting of the resin pressure varies corresponding to this difference in the length of time to the time of recognition. In the present invention, in order to make the peak pressure Pmax in the overshooting uniform, the rate of change of the command value for pressure, from the switch start pressure to the pressure-holding pressure, in the pressure control is changed.

In the pressure control in the pressure-holding process, the command value for pressure Pc is changed from the switch start pressure Ps preset as a pressure value with which the pressure control should be started to the preset pressure-holding pressure Pp in a transition time period T. A difference Ve between a pressure value Pr' detected as a value that has reached or exceeded the injection/pressure-holding switch determining resin pressure P(v–p) and the injection/pressure-holding switch determining resin pressure P(v–p), namely Ve=Pr'–P(v–p) is obtained. When the difference Ve is greater, the transition time period T is made shorter, and when the difference Ve is smaller, the transition time period T is made longer. By changing the rate of change of the command value for pressure Pc this way, the variation of the peak pressure Pmax is obviated.

When T0 is a reference transition time period and Ve is a difference between the detected pressure value Pr' and the injection/pressure-holding switch determining resin pressure P(v–p), the transition time period T is obtained by $$T = T0 - \alpha \times Ve \qquad (1).$$

Thus, when the difference Ve is greater, the transition time period is made shorter to decrease the command value for pressure Pc rapidly, to thereby suppress the overshooting of the resin pressure and thereby reduce the variation of the peak pressure Pmax.

Regarding the instances of FIGS. 1a and 1b, the difference Ve between the pressure value Pr' detected as a value that has reached or exceeded the injection/pressure-holding switch determining resin pressure P(v–p) and the injection/pressure-holding switch determining resin pressure P(v–p) is greater in the instance of FIG. 1a, and therefore, the transition time period T is made shorter and the rate of decrease of the command value for pressure Pc is made greater in the instance of FIG. 1a, correspondingly. As a result, the overshooting of the actual resin pressure Pr after the pressure value that has reached or exceeded the injection/pressure-holding switch determining resin pressure P(v–p) is detected is more suppressed in the instance of FIG. 1a than in the instance of FIG. 1b. Thus, as clear from comparison between FIG. 1 and FIG. 2, the variation ΔPmax of the peak pressure Pmax is controlled to be smaller in the instance of the present invention shown in FIG. 1.

Figure 3:
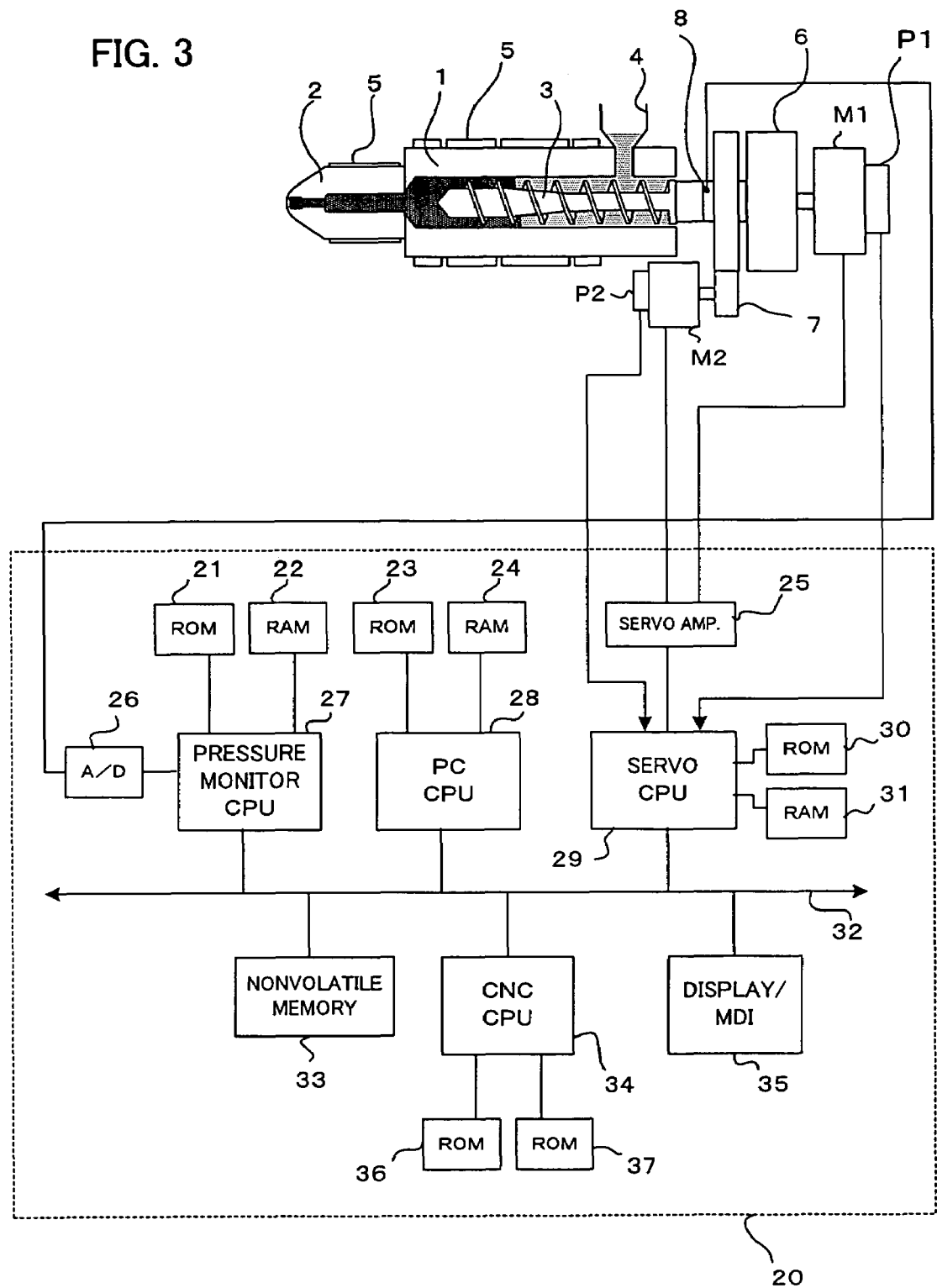
FIG. 3 is a block diagram showing an embodiment of the present invention.

FIG. 3 is a block diagram showing relevant parts of a controller of injection molding machine as an embodiment of the present invention, which employs the above-described way of control.

A nozzle 2 is attached to the forward end of a heating cylinder 1. In the heating cylinder 1 is inserted an injection screw 3. A heater 5 is attached to the heating cylinder 1. To the injection screw 3 is attached a pressure sensor 8 such as a load cell which detects the resin pressure from the pressure exerted on the injection screw 3. Alternatively, in-mold resin pressure may be detected by arranging a pressure sensor for detecting the resin pressure in the mold. The injection screw 3 is driven to rotate by a screw rotation servomotor M2 through a transmission means 7. The injection screw 3 is also driven to move along the axis of the injection screw 3 by an injection servomotor M1 through a mechanism 6 such as a ball screw/nut mechanism for converting rotational motion to linear motion. Symbols P1 and P2 represent position speed detectors for detecting the position and speed of each servomotor.

A controller 20 includes a CNC CPU 34 which is a microprocessor for numerical control, a PC CPU 28 which is a microprocessor for programmable controller, a servo CPU 29 which is a microprocessor for servo control, and a pressure monitor CPU 27 which samples a pressure signal from the pressure sensor 8 (or a sensor for detecting the in-mold resin pressure (not shown)) by means of an A/D converter 26 and stores the sampled values in RAM 22. Information can be transmitted between these microprocessors through a bus 32 by choosing input/output.

To the CNC CPU 34, ROM 36 in which automatic operation programs for generally controlling the injection molding machine, etc. are stored and RAM 37 for temporarily storing operation data are connected. To the PC CPU 28, ROM 23 in which sequence programs for controlling the sequential operation of the injection molding machine, etc. are stored and RAM 24 for temporarily storing operation data are connected.

To the servo CPU 29, ROM 30 in which control programs dedicated to servo control including position loops, speed loops and current loops are stored and RAM 31 for temporarily storing data are connected. To the servo CPU 29, also a servo amplifier 25 for driving servomotors for each of axes for mold clamping, injection, screw rotation, ejector, etc. (in FIG. 3, only the injection servomotor M1 and the screw rotation servomotor M2 are shown) on the basis of commands from the CPU 29 is connected, and an output from the position•speed detector attached to the servomotor for each axis is fed back to the servo CPU 29.

To the pressure monitor CPU 27, ROM 21 in which control programs for control performed by the pressure monitor CPU 27 are stored and RAM 22 for storing the resin pressure value detected by the pressure sensor 8 are connected.

To the bus 32, a molding data storing nonvolatile memory 33 for storing molding conditions, set values, parameters, macro variables, etc. concerning injection molding, and a manual data input device 35 with a display using CRTs or liquid crystals are connected.

In a measurement process, the CNC CPU 34 drives the screw rotation servomotor M2 and controls its rotation, and also drives the injection screw 3 and controls the back-pressure. Resin supplied from a hopper 4 is heated and melted by the rotation of the injection screw 3 and the heater 5 attached to the heating cylinder 1. Due to the pressure of the resin melted, the injection screw 3 moves backward (to the right side in FIG. 3) against the back-pressure, so that an exact amount of resin is measured out.

In the injection process, by driving the injection servomotor M1, the injection screw 3 is moved forward (to the left side in FIG. 3). While the speed of movement of the injection screw 3 is controlled, the melted resin is injected into the cavity of the mold (not shown) through the nozzle 2. When the cavity is filled with the resin, the switch to the pressure feedback control for the pressure-holding process is performed.

The above-described structure and function of the injection molding machine and of the controller for it is the same as that of a conventional injection molding machine and of a controller for it. However, in the present embodiment, control in an initial stage of the pressure-holding control after the speed control for the injection process is switched to the pressure control for the pressure-holding process is different from conventional control. Specifically, the control is different in that when a pressure value that has reached or exceeded the injection/pressure-holding switch determining resin pressure P(v–p) is detected by the pressure sensor 8, the transition time period is obtained as mentioned above and the pressure control is performed so that the pressure changes from the switch start pressure to the preset pressure-holding pressure in the transition time period obtained.

Figure 4:
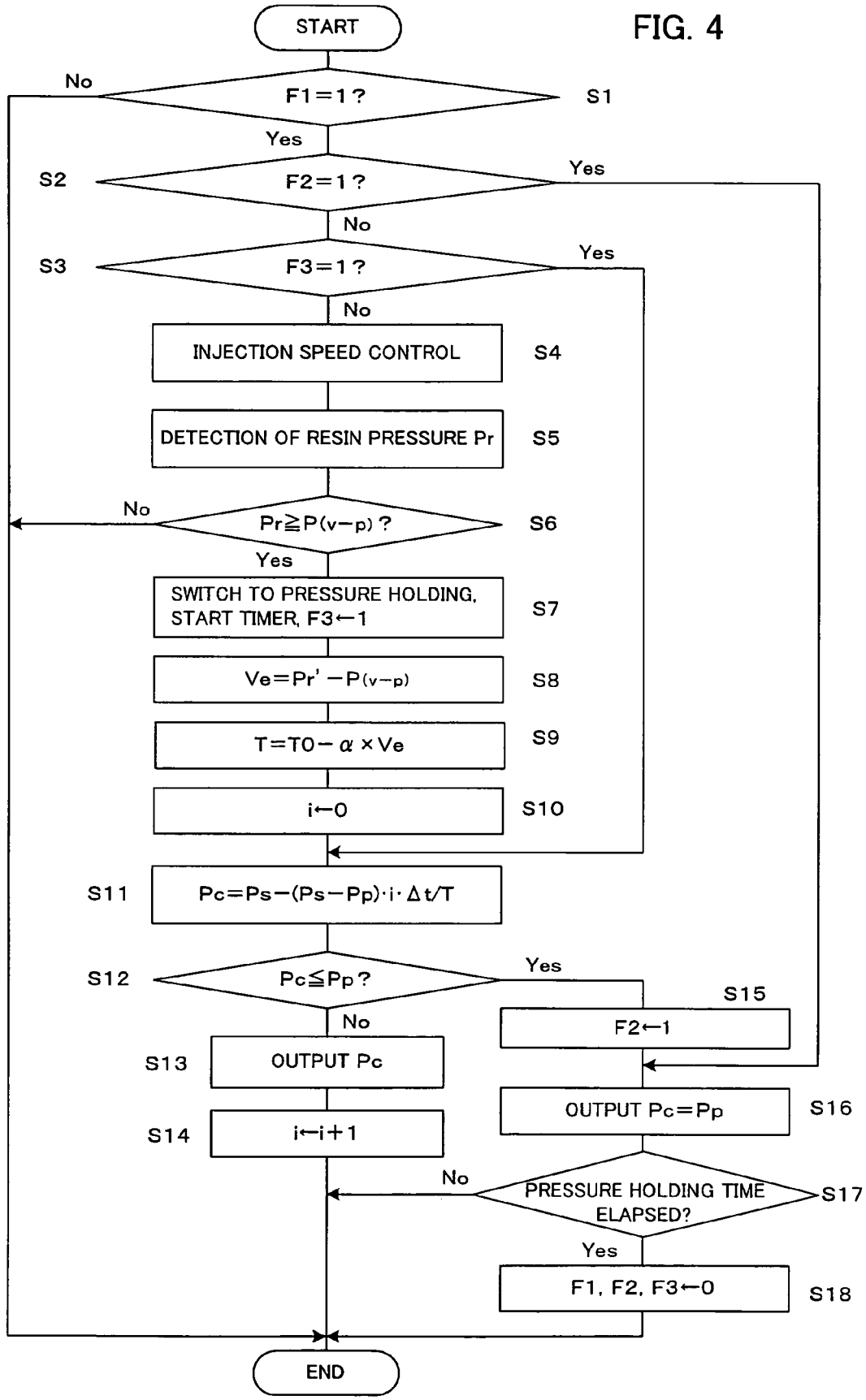
FIG. 4 is a flow chart showing the injection•pressure-holding process in this embodiment.

FIG. 4 is a flow chart showing an injection•pressure-holding routine which the CNC CPU 34 executes at every predetermined period in the present embodiment.

First, the CNC CPU 34 determines whether or not an injection/pressure-holding processes flag F1 is "1" (Step S1). This flag is set to "1" in another task, when the measurement process ends, so that the machine becomes ready to inject resin. If the flag F1 is not "1", the processing at present processing period terminates. If the flag F1 is "1", the CNC CPU 34 determines whether or not a pressure-holding process flag F2 is "1" (Step S2). This pressure-holding process flag F2 and a transition flag F3 (described later) are initially set to "0" in initial setting. Since the pressure-holding process flag F2 is initially "0", the procedure proceeds from Step S2 to Step S3, where it determines whether or not the transition flag F3 is "1". Since the flag F3 is also "0" initially, the procedure proceeds to Step S4, where it starts injection speed control, namely drives the injection servomotor M1 and controls the speed of injection by the injection screw 3 in a way similar to a conventional way. Then, the CNC CPU 34 obtains a resin pressure value Pr detected by the pressure sensor 8 (Step S5), and determines whether or not the detected resin pressure value Pr is equal to or greater than the injection/pressure-holding switch determining resin pressure P(v–p) (Step S6). If the detected resin pressure value Pr is less than the injection/pressure-holding switch determining resin pressure P(v–p), the processing at the present processing period terminates. After this, until a resin pressure value Pr equal to or greater than the injection/pressure-holding switch determining resin pressure P(v–p) is detected, the injection speed control for the injection process is performed by performing Steps S1 to S6 at every predetermined period.

If, in Step S6, the CNC CPU 34 determines that the detected resin pressure value Pr is equal to or greater than the injection/pressure-holding switch determining resin pressure P(v–p), the CNC CPU 34 gives the servo CPU 29 a command to switch the speed control to the pressure control for the pressure-holding process, so that the servo CPU 29 switches the speed control to the pressure control. The CNC CPU 34 resets and starts a timer for measuring the time for which the pressure holding is performed, sets the transition flag F3 to "1" (Step S7), and obtains a difference Ve by subtracting the preset injection/pressure-holding switch determining resin pressure P(v–p) from the detected pressure value Pr as Pr' (Step S8). Then the CNC CPU 34 obtains a transition time period T by subtracting the difference Ve multiplied by a coefficient α from a preset reference transition time period T0 (Step S9). Thus, as mentioned above, when the difference Ve is greater, the transition time period T is made shorter.

Next, the CNC CPU 34 sets an indicator i to "0" (Step S10) and calculates a command value for pressure Pc for pressure feedback control in the pressure-holding process, according to expression (2) below (Step S11).

$$Pc = Ps - (Ps - Pp) \cdot i \cdot \Delta t / T \tag{2}$$

Here, Ps is a switch start pressure preset as a pressure value with which the switch from the injection process to the pressure-holding process should be started, and Δt is the period with which the routine of FIG. 4 is executed, which is equal to the sampling period with which the resin pressure is sampled. T is the transition time period obtained in Step S9.

The CNC CPU 34 determines whether or not the obtained command value for pressure Pc is equal to or less than the preset pressure-holding pressure Pp (Step S12). If the obtained command value for pressure Pc is greater than the pressure-holding pressure Pp, the CNC CPU 34 outputs the obtained command value Pc as a command value for pressure for the present processing period (Step S13). The servo CPU 29 performs pressure feedback control on the basis of this command value for pressure and the resin pressure value Pr' detected by the pressure sensor 8. Then, the CNC CPU 34 adds "1" to the indicator i (Step S14), with which the processing at the present processing period terminates.

In the subsequent processing periods, since the transition flag F3 has been set to "1", the procedure proceeds through Steps S1, S2 and S3 to Step S11, and performs Step S11 and succeeding steps. As long as the command value for pressure Pc obtained in Step S11 is greater than the preset pressure-holding pressure Pp, the CNC CPU 34 performs Steps S1, S2, S3, S11, S12, S13 and S14 in each processing period.

When, in Step S12, the CNC CPU 34 determines that the command value for pressure Pc is equal to or less the preset pressure-holding pressure Pp, the procedure proceeds to Step S15, sets the pressure-holding flag F2 to "1", and outputs the preset pressure-holding pressure Pp as a command value for pressure Pc (Step S16). The CNC CPU 34 determines whether or not the time measured by the timer is equal to or greater than a preset pressure-holding time (Step S17). If the time measured by the timer is less than the preset pressure-holding time, the processing at the present processing period terminates. In the subsequent processing periods, since the pressure-holding process flag F2 has been set to "1", the CNC CPU 34 performs Steps S1 and S2 and then the procedure proceeds to Step S16. As long as the time measured by the timer is less than the preset pressure-holding time, the CNC CPU 34 performs Steps S1, S2, S16 and S17 in each processing period. When, in Step S17, the CNC CPU 34 determines that the pressure-holding time has expired, the CNC CPU 34 sets the flags F1, F2 and F3 to "0". With this, the injection•pressure-holding process ends.

The command value for pressure Pc supplied in the transition time period in the instance shown in FIG. 1a will be explained. In the instance of FIG. 1a, the transition time period T obtained in Step S9 is three times the operation period 3 ·Δt. In this instance, expression (2) giving the command value for pressure Pc in Step S11 is rewritten to expression (3) below.

$$Pc = Ps - (Ps - Pp) \cdot i \cdot \Delta t / 3 \cdot \Delta t = Ps - (Ps - Pp) \cdot i / 3 \tag{3}$$

At the time the pressure-holding process is started, the indicator i has been set to "0" in Step S10. Hence, the command value for pressure Pc=Ps, so that the switch start pressure Ps preset as a pressure value with which the switch from the injection process to the pressure-holding process should be started is supplied as a command value for pressure Pc. In the subsequent processing periods, a value decreased by (Ps−Pp)/3 each is supplied as a command value for pressure Pc. When the indicator i is "3", Pc=Pp, so that the result of the determination in Step S12 is YES, so that the preset pressure-holding pressure Pp is supplied as a command value for pressure Pc. After this, until the pressure-holding time expires, the pressure-holding pressure Pp is supplied as a command value for pressure Pc.

In the instance of FIG. 1b, the transition time period T obtained in Step S9 is four times the sampling period, namely T=4·Δt. In this instance, expression (2) is rewritten to expression (4) below.

$$Pc=Ps-(Ps-Pp)\cdot i/4 \qquad (4)$$

At the time the pressure-holding process is started, the indicator i is "0", so that the command value for pressure Pc=Ps. Thus, the switch start pressure Ps preset as a pressure value with which the switch from the injection process to the pressure-holding process should be started is supplied as a command value for pressure. In the fourth period in which the indicator i is "4", the command value for pressure Pc=Pp. After this, until the pressure-holding time expires, the preset pressure-holding pressure Pp is supplied as a command value for pressure.

As described above, when the speed control for the injection process is switched to the pressure control for the pressure-holding process, control is performed, changing the transition time period T in which the pressure should be changed from the preset switch start pressure Ps to the preset pressure-holding pressure Pp, on the basis of the difference Ve between the pressure value Pr' detected as a value that has reached or exceeded the injection/pressure-holding switch determining resin pressure P(v−p) and the injection/pressure-holding switch determining resin pressure P(v−p). By this, the variation ΔPmax of the peak pressure Pmax appearing in the overshooting of the pressure is reduced. Since the variation ΔPmax of the peak pressure Pmax is reduced, molded articles of good quality can be obtained.

In the embodiment described above, the transition time period T is adjusted on the basis of the difference Ve between the injection/pressure-holding switch determining resin pressure P(v−p) and the pressure value Pr' detected as a value that has reached or exceeded the injection/pressure-holding switch determining resin pressure P(v−p). Instead of changing the transition time period T, the variation ΔPmax of the peak pressure may be reduced by changing the value which the pressure feedback gain takes immediately after the pressure-holding process starts. In this instance, the pressure feedback gain is made greater when the difference Ve is greater.

What is claimed is:

1. A controller of an injection molding machine, for controlling resin pressure in switching an injection process to a pressure-holding process by changing a command value of the resin pressure from a preset first value to a preset second value for the pressure-holding process in a preset transition time period, said controller comprising:
    detecting means for detecting the resin pressure;
    determining means for performing comparison of the resin pressure detected by said detecting means with a preset switching pressure for switching the injection process to the pressure-holding process at every predetermined sampling period, and determining completion of the injection process when the detected resin pressure exceeds the preset switching pressure; and
    correcting means for correcting the transition time period according to a difference between the preset switching pressure and the detected resin pressure when the completion of the injection process is determined by said determining means after the injection process is started.

2. A controller of injection molding machine according to claim 1, wherein said correcting means obtains a correction time period by multiplying said difference by a preset correction coefficient, and corrects the transition time period to be a value obtained by subtracting the correction time period from a reference transition time period.

3. A controller of injection molding machine according to claim 1, wherein said detecting means detects the resin pressure as a pressure exerted on an injection screw.

4. A controller of injection molding machine according to claim 1, wherein said detecting means detects the resin pressure as a pressure in a mold.

5. A controller of an injection molding machine, for controlling resin pressure by switching a feedback control of an injection speed for an injection process to a feedback control of the resin pressure for a pressure-holding process, said controller comprising:
    detecting means for detecting the resin pressure in the injection process;
    determining means for performing comparison of the resin pressure detected by said detecting means with a preset switching pressure for switching the injection process to the pressure-holding process at every predetermined sampling period, and determining completion of the injection process when the detected resin pressure exceeds the preset switching pressure; and
    correcting means for correcting a feedback gain of the feedback control of the resin pressure in a period immediately after the pressure-holding process is started, according to a difference between the preset switching pressure and the detected resin pressure when the completion of the injection process is determined by said determining means after the injection process is started.

6. A controller of injection molding machine according to claim 5, wherein said detecting means detects the resin pressure as a pressure exerted on an injection screw.

7. A controller of injection molding machine according to claim 5, wherein said detecting means detects the resin pressure as a pressure in a mold.

* * * * *

UNITED STATES PATENT AND TRADEMARK OFFICE
CERTIFICATE OF CORRECTION

PATENT NO. : 7,261,540 B2
APPLICATION NO. : 11/149189
DATED : August 28, 2007
INVENTOR(S) : Tatsuhiro Uchiyama et al.

It is certified that error appears in the above-identified patent and that said Letters Patent is hereby corrected as shown below:

On the Title Page, Item (57) (Abstract), Line 9, change "P(v-P)" to --P(v-p)--.

Column 3, Line 27, change "vanes" to --varies--.

Column 4, Line 58, after "pressure" delete ".".

Column 8, Line 61, change "3 ·$\Delta$t" to --3·$\Delta$t--.

Signed and Sealed this

Twenty-seventh Day of May, 2008

JON W. DUDAS
*Director of the United States Patent and Trademark Office*